Patented Sept. 10, 1946

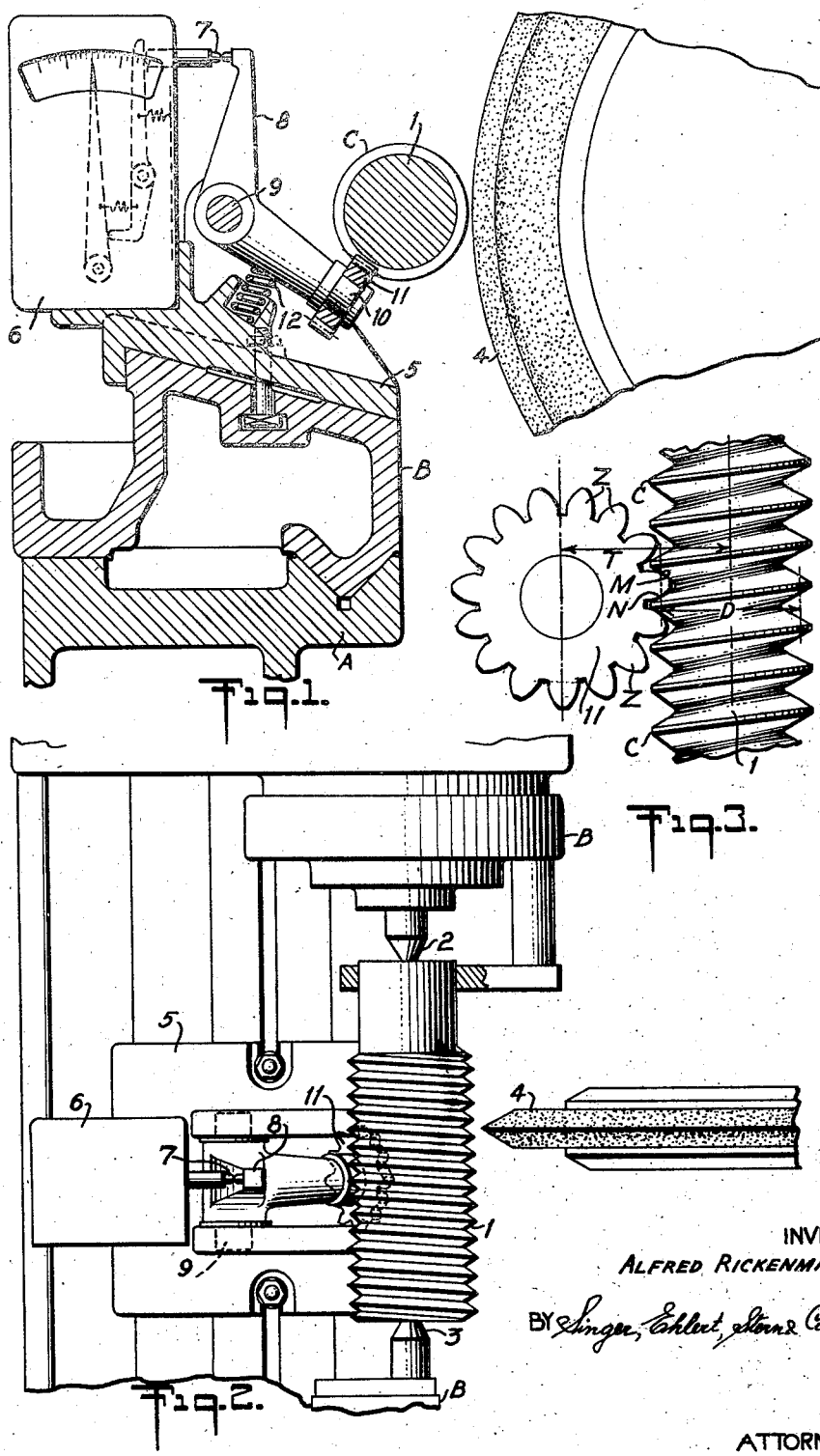

2,407,576

UNITED STATES PATENT OFFICE 2,407,576

MEASURING AND TESTING DEVICE

Alfred Rickenmann, Zurich, Switzerland

Application March 1, 1943, Serial No. 477,571
In Germany January 27, 1942

4 Claims. (Cl. 33—199)

The present invention relates to a new and improved device to test and to measure the pitch diameter of screw-threaded portions of a work-piece.

The main object of the invention is to provide a device to test the diameter while the screw threads are being cut.

A further object is to provide such a device which will take the measurement of the diameters on the flanks of the screw threads cut on cylindrical work-pieces.

I attain these objects by the provision of a rotary toothed disk the teeth being adapted to engage the flanks of the screw threads.

In the accompanying drawing an embodiment of my invention is shown in a diagrammatical manner.

Fig. 1 shows part of a machine to grind screw threads with the new measuring device in its operative position in side elevation and in section.

Fig. 2 is a top view thereof.

Fig. 3 shows the measuring disk in engagement with the work-piece in a front view.

On the bed A of a thread grinding machine of known construction a carriage B is slidably mounted. The carriage B carries between the points 2 and 3 a cylindrical work-piece 1 on which screw threads are to be formed by a grinding wheel 4. The drive of said grinding wheel and the feed thereof may be of any known construction. On the carriage B the thread testing device 5 is adjustably mounted by means of screw bolts. The device 5 comprises a double armed lever rotatably mounted on a horizontal shaft 9. On one arm of lever 8 a stud 10 is arranged in which a toothed disk 11 is rotatably mounted. As shown in Fig. 1 the axis of rotation of the disc is arranged at right angles to the axis of rotation of the workpiece and radially spaced therefrom. The teeth Z of the disk 11 and the pitch thereof is such that the teeth can engage the flanks of the threads C to be formed. The second arm of lever 8 actuates a pin 7 of an indicator 6. A coiled spring 12 presses the toothed disk 11 onto the work-piece 1. The pitch of the toothed disk 11 corresponds with the lead of the screw thread to be formed in the work-piece 1. When grinding metrical threads the pressure angle of the teeth of the disk 11 is exactly 30 degrees. The work-piece 1 which turns while the threads are being ground by the grinding wheel 4 drives the disk 11. The distance T of the axis of rotation of disk 11 and that of the work piece 1 decreases while the thread grinding proceeds. This distance is measured and shown by the indicator 6. The flanks of the teeth Z of the disk 11 are in close touch with the flanks M and N of the threads C. The measurement is taken therefore between the flanks M and N of the threads and at the pitch circle D. The measurement is taken continuously and the grinding may be stopped by hand or by automatic means.

What I claim by United States Letters Patent is:

1. In a grinding gauge for screw threads, the combination of a member rotatably supporting the work to be gauged, a lever pivoted intermediate its ends, a toothed disc rotatably supported on the free end of one arm of the lever to rotate on an axis at right angles to the axis of rotation of the work, the lever being mounted with respect to the work to be gauged to cause the toothed disc to recede from the work by gravity, means for urging the toothed disc against gravity into mesh engagement with the thread to be gauged, and means operable by the other free end of the lever for indicating the extent of movement gone through by said toothed disc under the control of said urging means.

2. In a grinding gauge for screw threads, the combination of means rotatably supporting the work to be gauged, a lever pivotally mounted about an axis spaced from the axis of rotation of the work, a toothed disc rotatably supported at one end of said lever to rotate about an axis transversely of the axis of rotation of the work and radially spaced therefrom, means engaging said lever for yieldingly urging it in a direction in which said toothed disc is caused to mesh with the thread on the work, and means operable by said lever for indicating the extent of movement of the axis of rotation of said toothed disc toward the axis of rotation of the work.

3. In a grinding gauge for screw threads, the combination of means rotatably supporting the work to be gauged, a lever pivotally mounted between its ends about an axis parallel to and spaced from the axis of rotation of the work, a toothed disc rotatably supported at one end of said lever to rotate about an axis at right angles to the axis of rotation of the work and radially spaced therefrom, spring means for yieldingly urging said lever in a direction in which said toothed disc is caused to engage the thread on the work, and means operable by said lever and engaged by the other end of the same for indicating the extent of movement of the axis of rotation of said toothed disc with respect to the axis of rotation of the work.

4. In a grinding gauge for screw threads, the combination of means rotatably supporting the work to be gauged, a lever pivotally mounted about an axis spaced from the axis of rotation of the work, a toothed disc rotatably supported at one end of said lever to rotate about an axis transversely of the axis of rotation of the work and radially spaced therefrom, means engaging said lever for yieldingly urging it in a direction in which said toothed disc is caused to mesh with the thread on the work, and means operable by said lever for indicating the extent of movement of the axis of rotation of said toothed disc toward the axis of rotation of the work, the teeth on said toothed disc having a pitch corresponding to the lead of the screw thread on the work.

ALFRED RICKENMANN.